United States Patent [19]

Gilmanov et al.

[11] Patent Number: 4,977,091
[45] Date of Patent: Dec. 11, 1990

[54] METHOD FOR PREPARING PHOSPHATIDYLINOSITOL FROM VEGETABLE MATTER

[76] Inventors: Murat K. Gilmanov, mikroraion "Koktem-3", 13 kv. 62; Rsai Dilbarkanova, ulitsa Satpaeva, 93, kv. 27; Beibyt E. Sultanbaev, ulitsa krasina, 107, kv. 92, all of, Alma-Ata, U.S.S.R.

[21] Appl. No.: 241,980

[22] PCT Filed: May 21, 1987

[86] PCT No.: PCT/SU87/00059

§ 371 Date: Jun. 30, 1988

§ 102(e) Date: Jun. 30, 1988

[87] PCT Pub. No.: WO88/03407

PCT Pub. Date: May 19, 1988

[30] Foreign Application Priority Data

Nov. 12, 1986 [SU] U.S.S.R. .............................. 4142793

[51] Int. Cl.$^5$ ........................... C11C 1/00; C07F 9/10
[52] U.S. Cl. ..................................... 435/271; 260/403
[58] Field of Search ......................... 435/271; 260/403

[56] References Cited

U.S. PATENT DOCUMENTS 2,397,874  4/1946  Lloyd et al. ...................... 435/271
2,508,624  5/1950  Singer et al. ..................... 260/403
2,855,416  10/1958 Hennessy et al. ................ 260/403
4,169,090  9/1979  Murray .

FOREIGN PATENT DOCUMENTS 2442633  6/1980  France .
11236994 3/1981  U.S.S.R. .

OTHER PUBLICATIONS

Preparative Chemistry of Lipids.

*Primary Examiner*—Sam Rosen
*Attorney, Agent, or Firm*—Ladas & Parry

[57] ABSTRACT

A method for preparing phosphatidylinositol from a vegetable matter comprises homogenization thereof in a water-salt solution with a molar concentration of from 0.005 to 1 M at a pH within the range of from 5.0 to 11.0. The homogenizate is centrifugated at a gravity acceleration value of 3,000–30,000 g or filtered on a filter with a pore size of 3–50 μm to separate the cell-free water-salt phase containing particles of the protein-phosphatidylinositol complex which are separated by means of alkaline or neutral proteases or by way of gel-chromatography or ultrafiltration. From the separated particles of the protein-phosphatidylinositol complex the product is extracted with methanol or with distilled water.

8 Claims, No Drawings

METHOD FOR PREPARING PHOSPHATIDYLINOSITOL FROM VEGETABLE MATTER

FIELD OF THE INVENTION

The present invention relates to the art of preparation of lipids and, more particularly, to a method for preparing phosphatidylinositol from a biological object.

Phosphatidylinositol pertains to the class of phospholipids and is useful as a biochemical reagent: for the preparation of membrane system simulating processes in live organisms; for the formation of liposomes serving for transferring foreign genetic information into cells of live organisms; for transportation of foreign proteins, vaccines and enzymes through membrane barriers; for delivering pharmaceutical preparations and other agents into the target tissues.

PRIOR ART

Known in the art are a number of methods for preparing phosphatidylinositol from various biological objects such as heart and brains of animals, from bacteria and seeds. Also known in the art is a method for preparing phosphatidylinositol from yeast (cf. Preparative Chemistry of Lipids, ed. by L. D. Bergelson and E. V. Dyatlovitskaya, 1981, Moscow, "Nauka" Publishers, p. 178).

The method for preparing phosphatidylinositol from yeast comprises autolysis of yeast by means of toluene for 5 hours, extraction of phospholipids with a mixture of chloroform:methanol (1:1) for 7 hours; filtration of the extract with washing of the filter cake with the abovementioned mixture of the organic solvents; stirring of the filtrate with distilled water for 20 hours; separation of the filtrate into chloroformic and aqueous phases; evaporation of the chloroformic phase; treatment of the evaporated chloroformic phase with isopropanol and its subsequent filtration through a glass filter. Then phospholipids are separated from the resulting filtrate in a column with silica gel by way of a successive, elution thereof first with 5–7 litres of a mixture chloroform-methanolammonia (80:20:2) and then with 1–2 liters of ethanol and in this manner ammonium salt of phosphatidylinositol is recorvered which is then transformed into sodium salt.

This method necessitates a great consumption rate of expensive organic solvents. Thus, for the preparation of 1 g of phosphatidylinositol it is necessary to employ more than 5 l of chloroform, more than 3 l of methanol, about 1 l of ethanol and other solvents. The method involves many labour-intensive operations taking a long time. All this considerably adds to the costs of the final product (according to the Calbiochem catalogue 1 g of phosphatidylinositol costs 6,950 U.S. dollars). Operation with great amounts of organic solvents creates harmful conditions of labour which hinders provision of normal environment for the operating personnel.

DISCLOSURE OF THE INVENTION

It is an object of the present invention to provide such a method for preparing phosphatidylinositol which would make it possible to substantially reduce the rate of consumtion of organic solvents, to lower labour-intensity and time consumption, improve labour conditions and considerably reduce costs of the product.

This object is accomplished by a method for preparing phosphatidylinositol from a biological object by way of its homogenization and extraction of the product which, according to the present invention, comprises:

homogenization of a biological object in an aqueosaline solution with a molar concentration of from 0.005 to 1 M at a pH within the range of from 5.0 to 11.04;

separation of the resulting homogenizate into a cell-free water-salt phase containing particles of a protein-phosphatidylinositol complex and a precipitate containing non-broken cells and particles of other phospholipids by centrifugation at a gravity acceleration of from 3,000 to 30,000 g or by filtration on a filter with a pore size of from 3 to 50 $\mu$m;

recovery of particles of the protein-phosphatidylinositol complex from the cell-free water-salt phase;

extraction of phosphatidylinositol from the recovered particles of the protein-phosphatidylinositol complex.

The recovery of the particles of the protein-phosphatidylinositol complex from the cell-free water-salt phase can be effected by gel-chromatography on a sorbent capable of separating substances with a molecular mass of more than 1 mln Dalton or by ultrafiltration in a filter with a pore size of not less than 0.2 $\mu$m. Furthermore, the recovery of particles of the protein-phosphatidylinositol complex from the above-mentioned water-salt phase can be effected by way of treatment thereof with alkaline or neutral proteases, so that these particles get aggregated and can be readily separated. This mode of recovering particles of the protein-phosphatidylinositol complex is preferred, since it is simple in implementation and the above-mentioned reagent, notably proteases is rather readily available and comparatively inexpensive.

From the recovered particles of the protein-phosphatidylinositol complex the desired product is isolated by extraction with methanol or a mixture thereof with chloroform or distilled water. As the biological object it is advisable to use products of processing of seeds of gramineous plants, since these raw materials are more readily available, inexpensive and enabling a high yield of the desired product.

The method according to the present invention makes it possible to reduce by hundreds times, as compared to the prior art method, the rate of consumption of organic solvents, by 2 to 4 times shorten the process duration, to considerably lower the production costs and to improve labour conditions.

The process can be readily implemented on a commercial scale.

The advantages of the present invention will become more clearly apparent from the following detailed description of the method for preparing phosphatidylinositol.

As a biological object use can be made of seeds of plants, products of their processing, roots, leaves, stems, as well as animal tissues and microorganisms, but it is preferable to use seeds of gramineous plants and products of processing thereof such as siftings. This is due to the fact that these raw materials are readily available and inexpensive and enable a high yield of phosphatidylinositol.

The biological object is subjected to homogenization by way of its rubbing in a mortar or in a blade homogenizator, or in any other suitable apparatus.

The homogenization of the biological object according to the present invention is carried out in a water-salt solution with a molar concentration ranging from 0.005 to 1M. This range of the salt concentration is determined by the fact that a concentration of the salt in water of less than 0.005M is undesirable, since it causes dissolution of the protein-phosphatidylinositol complex and this hinders preparation of the product. The upper limit of the molar concentration of the salt can be over the value of 1M up to the ultimate solubility of the employed salt at room temperature. However, it is advisable that the upper limit of the salt concentration be set at 1M. Increasing the molar concentration of the salt above 1M does not result in an increased yield of the desired product and brings about an unreasonably high rate of consumption of the reagent. An optimal molar concentration of the salt is within the range of from 0.05 to 0.1M.

For the preparation of a water-salt solution use can be made of any organic or inorganic salts, except for salts capable of decomposing the protein-phosphatidylinositol complex and possessing chaotropic properties. It is most preferable to use salts with neutral or weakly alkaline properties such as sodium chloride, sodium or potassium salts of phosphoric acid, as well as tris-hydroxyaminomethane chlorides, phosphates or sulphates.

According to the present invention, the homogenization of the biological object is carried out in a water-salt solution having pH within the range of from 5 to 11. This limit of the pH of the water-salt solution is determined by the fact that at a pH below 5 and above 11 particles of the protein-phosphatidylinositol complex are broken which is inadmissible.

Upon homogenization of this object in the above-mentioned water-salt solution the biological object cells are decomposed with liberation, into the water-salt phase, of particles of the protein-phosphatidylinositol complex. To separate the particles of the protein-phosphatidylinositol complex from the non-destroyed cells and particles containing other phospholipids, the homogenizate according to the present invention is subjected to centrifugation or filtration. Centrifugation of the homogenizate is effected at a gravity acceleration value within the range of from 3,000 to 30,000 g. This limit is determined by the fact that upon centrifugation of less than 3,000 g the particles containing other phospholipids would not precipitate and remain in the water-salt phase thus resulting in contamination of phosphatidylinositol with other phospholipids.

Upon centrifugation at above 3,000 g the particles of the protein-phosphatidylinositol complex are precipitated which substantially lowers the yield of the product. An optimal range of the gravity acceleration value is of from 8,000 to 10,000 g.

Separation of the homogenizate can be effected by way of filtration in a filter with a pore size of from 3 to 50 μm. The homogenizate filtration in a filter with a pore size of less than 3 μm is inadvisable, since it results in retention of the particles of the protein-phosphatidylinositol complex on the filter, thus lowering the yield of the desired product. The homogenizate filtration in a filter with a pore size of above 50 μm is also undesirable, since particles containing other phospholipids will pass into the water-salt phase which substantially lowers quality of the desired product.

As a result of separation of the homogenizate by the above-described techniques, a cell-free water-salt phase is obtained which contains particles of the protein-phosphatidylinositol complex, as well as a precipitate containing other phospholipids which residue is discarded.

Particles of the protein-phosphatidylinositol complex can be recovered from the water-salt phase by way of gel chromatography using sorbents enabling separation of substances with a molecular mass of more than one million Dalton. Sorbents separating substances with a molecular mass of less than 1 mln Dalton are inacceptable, since they do not enable separation of particles of the protein-phosphatidylinositol complex. The best sorbents are gels such as "Sepharose", "Sephacryl" available from "Pharmacia" (a Swedish company), "Ultrogel" ("LKB" company, Sweden), "Biogel A" ("Biorad" company, USA), "Toyapearl" ("Toyasoda" company, Japan).

The separation of particles of the protein-phosphatidylinositol complex from the cell-free water-salt phase can be effected by way of ultrafiltration in a filter with a pore size of not more than 0.2 μm. It is inadvisable to use filters with a pore size of more than 0.2 μm, since particles of the protein-phosphatidylinositol complex will pass (penetrate) into the filtrate, thus lowering the yield of the desired product.

The recovery of particles of the protein-phosphatidylinositol complex from the cell-free water-salt phase can be also effected by way of their sedimentation in an ultracentrifuge at a value of gravity acceleration of from 30,000 to 100,000g. This limit is determined by the fact that at values of less than 30,000 g the particles will be settled but incompletely, while at values of more than 100,000 g the ultrafiltration is inexpedient, since it does not result in an increased yield of the desired product, but causes unreasonably high rates of power consumption.

In addition to the above-discussed embodiments of separation of particles of the protein-phosphotidylinositol complex, the present invention also provides for an embodiment of their separation by way of treatment of the cell-free water-salt phase with alkaline or neutral proteases. In the presence of such proteases the major portion of the protein is removed out of these particles, wherefore the particles get clogged and can be readily separated by a simple filtration on a paper or glass filter, or they are settled by centrifugation at low values of gravity acceleration ranging from 500 to 10,000 g. For this embodiment proteases are used in an amount of from 5 to 100 μg per liter of the water-salt phase. This limit is determined by the fact that the amount of the protease less than 5 μg/l is insufficient for a complete recovery of particles of the protein-phosphatidyl complex, while their amount of over 100 μg/l is inexpedient, since it provides no additional effect, but causes an unreasonably high rate of consumption of the reagent.

The separation of particles of the protein-phosphatidylinositol complex by means of the above-mentioned proteases is preferred in comparison with other embodiments of their separation. This is due to the fact that in the presence of alkaline or neutral proteases the particles of the protein-phosphatidylinositol complex adhere to each other and can be readily and in a simple manner separated by means of a paper or glass filter. Proteases are comparatively inexpensive and available products.

Then the separated particles of the protein-phosphatidylinositol complex are treated with diethyl ether or acetone, or any other similar organic solvent to remove lipid impurities therefrom. Thereafter, the product is extracted with methanol or with a mixture thereof with chloroform or distilled water. The yield of phosphatidylinositol is up to 90% of its content in the starting biological object.

As it follows from the detailed description of the present invention, the method according to the invention is simple as regards the process of its implementation; it does not require great rates of consumption of organic solvents, improves conditions of labour and shortens the process duration by about 2–4 times and considerably lowers the costs of the product.

BEST MODE FOR CARRYING-OUT THE INVENTION

As a biological object grain siftings, e.g. wheat siftings, are used. They are homogenized by way of rubbing in an aqueous 0.05–0.1M solution of tris-hydroxaminomethane chloride at a pH of 8.3–8.5 until a homogenizate is obtained. In so doing, the sifting cells are broken and particles of the protein-phosphatidylinositol complex pass into the water-salt phase. The resulting homogenizate is subjected to centrifugation at 10,000 g for 10 minutes. This results in separation of the cell-free water-salt phase containing particles of the protein-phosphatidylinositol complex from the unbroken cells and particles containing other phospholipids. From the thus-obtained cell-free water-salt phase particles of the protein-phosphatidyinositol complex are separated by treating this phase with alkaline or neutral proteases in the amount of 0.05 mg (or 50 μg) per 1 ml of the phase. In such treatment the particles of the protein-phosphatidylinositol complex adhere to one another and they are separated from the above-mentioned phase by way of centrifugation at 10,000 g. The resulting residue of particles of the protein-phosphatidylinositol complex is washed with diethyl ether to remove lipid impurities contaminating the product. From the purified residue of particles of the protein-phosphatidylinositol complex the product is extracted with methanol. The yield of the product is about 93% of its initial content in what siftings.

For a better understanding of the present invention, some specific examples illustrating the method for preparing phosphatidylinositol are given hereinbelow.

EXAMPLE 1

10 kg of corn flour are rubbed in a 0.05M aqueous solution of disodium phosphate with the pH of 9.0 in a porcelain mortar till a homogeneous state. To recover a cell-free water-salt phase, the homogenizate is filtered in a filter with the pore size of 5 μm. The cell-free water-salt phase is subjected to gel chromatography in a column with Sepharose 4 B to recover a fraction containing particles of a protein-phosphatidylinositol complex. This fraction is concentrated to dryness in a vacuum evaporator. The dry residue is treated with 50 ml of acetone to remove lipid impurities. The desired product is extracted with bidistilled water. The yield of the desired product is 0.09 g (8.9%).

EXAMPLE 2

10 g of pea grains are ground in a mill, then the milled mass is homogenized in a blade-type homogenizer in a 0.1M solution of $Na_2CO_3$ at the pH of 11.0. The homogenizate is centrifuged at 10,000 g for 10 minutes. The resulting cell-free water-salt phase is subjected to ultracentrifugation at 30,000 g. The residue is washed with 50 ml of diethyl ether. The product is extracted with 5 ml of methanol. The product yield is 0.02 g (65%).

EXAMPLE 3

10 g of acorns are ground in a mill. The resulting flour is rubbed in an equeous solution of sodium acetate with the concentration of 0.1M at the pH=5. The thus-obtained homogenizate is subjected to centrifugation at 10,000 g for 10 minutes. The cell-free water-salt phase is gel-chromatographed on the sorbent Toya pearl HW 65. The fractions containing particles of the protein-phosphatidylinositol complex are evporated in a vacuum evaporator and treated with 50 ml of diethyl ether to remove lipid impurities. The product is extracted with 5 ml of methanol. The yield of the product is 0.01 g (20%).

EXAMPLE 4

10 of siftings of barley grains are rubbed in a 0.005M aqueous solution of potassium chloride with the pH=7. The resulting homogenizate is subjected to centrifugation at 10,000 g for 10 minutes. The cell-free water-salt phase containing particles of the protein-phosphatidylinositol complex is treated with papain in the amount of 50 μg per 1 ml of the above-mentioned phase for 4 hours. The aggregated particles of the protein-phosphatidylinositol complex are settled by centrifugation at 10,000 g for 10 minutes. The precipitate is washed with 50 ml of diethyl ether to remove lipid impurities and the product is extracted with 5 ml of a mixture methanol-chloroform (2:1). The yield of the product is 0.05 g (50%).

EXAMPLE 5

10 g of corn grains are ground and homogenized in a 0.05M aqueous solution of sodium chloride at the pH=7. The resulting homogenizate is subjected to centrifugation at 3,000 g for 10 minutes. The cell-free watersalt phase is separated and treated with trypsin in the amount of 50 μg per 1 ml of the above-mentioned phase. The aggregated particles of the protein-phosphatidylinositol complex are precipitated by filtration on a paper filter. The filter cake is washed with 50 ml of petroleum ether to remove lipid impurities. The product is extracted with 5 ml of methanol. The yield of the product is 0.7 g (90%).

EXAMPLE 6

10 g of corn siftings are homogenized in an aqueous solution of tris-hydroxyaminomethane phosphate with the concentration of 0.05M in a porcelain mortar. The resulting homogenizate is subjected to centrifugation at 30,000 g for 10 minutes. The cell-free water-salt phase is treated with chymotrypsin in the amount of 50 μg/ml for 8 hours. The aggregated particles of the protein-phosphatidylinositol complex are settled by centrifugation at 10,000 g for 10 minutes. The residue is treated with 50 ml of diethyl ether to remove lipid impurities. The product is extracted with 5 ml of methanol. The yield of the product is 0.02 g (18%).

EXAMPLE 7

10 g of wheat siftings are homogenized in an aqueous solution of tris-hydroxyaminomethane sulphate with the concentration of 0.1M at the pH of 8.5 for 10 minutes. The resulting homogenizate is filtered in a filter with the pore size of 50 μm. The separated cell-free water-salt phase is treated with papain in the amount of 50 μg per 1 ml of the above-mentioned phase for 4 hours. The adhered particles of the protein-phosphatidylinositol complex are settled by centrifugation at 10,000 g for 10 minutes.

The obtained residue is washed with 20 ml of diethyl ether to remove lipid impurities. The product is extracted with 2 ml of methanol. The yield of the product is 0.07 (85%).

EXAMPLE 8

10 g of wheat siftings are rubbed in an aqueous solution of tris-hydroxyaminomethane chloride with the concentration of 0.05 at the pH of 8.5. The resulting homogenizate is subjected to centrifugation at 10,000 g for 10 minutes. The cell-free water-salt phase is treated with papain in the amount of 50 µg/ml for 8 hours. The aggregated particles of the protein-phosphatidylinositol complex are settled by centrifugation at 10,000 g for 10 minutes. The precipitate is washed with 50 ml of diethyl ether to remove lipid impurities. The product is extracted from the precipitate with 5 ml of methanol. The yield of the product is 0.11 g (95%).

EXAMPLE 9

10 g of wheat siftings are homogenized in an aqueous solution of sodium chloride with the concentration of 0.05M at the pH of 7 in a homogenizator. The resulting homogenizate is subjected to centrifugation at 10,000 g for 10 minutes. The separated cell-free water-salt phase is subjected to filtration using an ultrafilter with the pore size of 0.2 µm. The cake is removed from the filter and washed with 50 ml of diethyl ether to remove lipid impurities. The product from the precipitate is extracted with 2 ml of methanol. The yield of the product is 0.06 g (63%).

INDUSTRIAL APPLICABILITY

The present invention can be implemented in the chemical industry, biotechnology and in medicine.

We claim:

1. A method of preparing phosphatidylinositol from vegetable matter containing phosphatidylinositol comprising the steps of:
   homogenization of the vegetable matter in a watersalt solution with a molar concentration of from 0.005 to 1M at a pH within the range of from 5.0 to 11.0;
   separation of the homogenizate into a cell-free water-salt phase containing particles of a protein-phosphatidylinositol complex and a residue containing unbroken cells and particles of other phospholipids, by way of centrifugation at a gravity acceleration value ranging from 3,000 to 30,000 g, or by filtration on a filter with a pore size of from 3 to 50 µm;
   separation of particles of the protein-phosphatidylinositol complex from the cell-free water-salt phase;
   extraction of phosphatidylinositol from the separated particles of the protein-phosphatidylinositol complex.

2. A method according to claim 1, characterized in that said homogenization of the vegetable matter is carried out in a water-salt solution with a molar concentration ranging from 0.05 to 0.1M.

3. A method according to claim 1, characterized in that said separation of the particles of the protein-phosphatidylinositol complex from the cell-free water-salt phase is effected by gel chromatography on a sorbent enabling separation of a substance with a molecular mass of more than 1 mln Dalton.

4. A method according to claim 1, characterized in that said separation of the particles of the protein-phosphatidylinositol complex from the cell-free water-salt phase is effected by way of ultrafiltration on a filter with a pore size of not more than 0.2 µm.

5. A method according to claim 1 wherein said separation of the particles of the proteinphosphatidylinositol complex from the cell-free water-salt phase is facilitated by addition of alkaline or neutral proteases to induce aggregation of the particles which are then separated.

6. A method according to claim 1 wherein said extraction of the phosphatidylinositol from the separated particles of the protein-phosphatidylinositol complex is effected by addition of a solvent selected from the group consisting of methanol, a mixture of methanol and chloroform and a mixture of methanol and distilled water and recovery of the methanol - and phosphatidylinositol - containing phase.

7. A method according to claim 1 wherein said vegetable matter is selected from the group consisting of seeds of plants, products of processing seeds of plants; roots, leaves, and stems.

8. A method according to claim 1 wherein said vegetable matter are seeds of gramineous plants or processing seeds of gramineous plants.

* * * * *